Patented Nov. 18, 1952

2,618,570

UNITED STATES PATENT OFFICE 2,618,570

PROCESS FOR PREPARING A GROUTING FLUID

Willfred C. Blackburn, Denver, Colo., assignor to the United States of America as represented by the Secretary of the Interior No Drawing. Application March 5, 1947, Serial No. 732,663

2 Claims. (Cl. 106—287)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to grouting and it particularly relates to grouting with alkyl silicon esters.

Chemical grouts previously used have suffered from one or all of the following faults. It has been impossible to satisfactorily regulate their time of set. Some grouts are sufficiently soluble in water that under severe conditions of pumping into water filled material they become diluted and will not set properly, or after setting they will dissolve. They will not fill large cavities because two solutions are used which set when they come in contact; this interfacial setting prevents the mixing necessary for solidification of the remainder. Likewise, deep uniform penetration and solidification are prevented by local premature setting. Some chemical grouts have too high viscosities for good penetration. Most chemical grouts are corrosive in nature and require special equipment for handling. Portland cement grouts and other grouts composed of particles suspended in liquid are not applicable to grouting voids in Portland cement concrete, rocks, or sand which are finer than the voids in minus 30 mesh sand, since the grout will not flow freely into holes of a diameter less than three times that of the largest suspended particles.

It is an object of the invention to provide a method of preparing a grouting fluid whereby the time of set can be controlled. It is another object of the invention to provide a method whereby the formation of silica gels from alkyl silicon esters can be controlled.

These objects are accomplished in accordance with the present invention by treating a partially hydrolyzed solution of an alkyl silicon ester in an organic solvent with an alkaline solution whereby the time of set can be controlled.

Suitable alkyl silicon esters for purposes of the invention include the group of organic silicates such as tetraethyl orthosilicate or ethyl orthosilicate, ethyl metasilicate, and hexamethyl disilicate or ethyl disilicate. The presently preferred member is ethyl orthosilicate since this material is insoluble in water, can be partially hydrolyzed easily, and is readily available.

Suitable organic diluent or solvents for purposes of the invention are those mutual solvents for the alkyl silicon ester and water. Such solvents include, acetone, methyl ethyl ketone, methyl acetate, ethyl acetate, ethyl alcohol, ethylene glycol, ethyl Cellosolve, diacetone alcohol and the like. It is presently preferred to use ethyl alcohol in this function, since even with relatively low solvent-ester ratios the aqueous alkaline material can be sufficiently dispersed in such solutions to insure formation of a homogeneous gel.

Suitable alkaline materials for purposes of the invention include those inorganic and organic bases and salts which form aqueous solutions having a pH of at least about 9, such as alkali metal and ammonium hydroxides and carbonates, alkali earth hydroxides, borax, trisodium phosphate, triethanol amine, diethanol amine, and the like. Concentrations of from about 0.01 to 30 percent have been found effective in controlling the time of set. The higher concentrations of the strong bases giving substantially instaneous setting of the gel.

The silica gels are formed by treating a partially hydrolyzed solution of the selected alkyl silicate in an organic solvent with an aqueous alkaline solution. Homogeneous gels have been produced from a wide range of solvent-ester ratios. For example, using ethyl orthosilicate and ethyl alcohol successful gels have been made from solutions having as little as 10 volumes of alcohol to 50 volumes of ester, and also from solutions having as much as 300 volumes of alcohol to 50 volumes of the ester. These solutions were partially hydrolyzed in the manner heretofore described.

The rate of gel formation is controlled by the concentration of the alkaline treating solution, and to some extent by agitation of the reactants during gelation. For example, two series of tests were made using the same partially hydrolyzed solution; 50 volumes of pure tetraethyl orthosilicate, 30 volumes of 95 percent ethyl alcohol, and one volume of pure water, the solution having been thoroughly mixed and then permitted to stand in excess of 24 hours to insure equilibrium of the hydrolysis reactions. In one series of tests to a known volume of this ester solution was added a known volume of 2.8 percent NH3 content ammonium hydroxide. The reactants were shaken for about 5 seconds and then set aside to gel. In the other series using the same reactant solution mechanical agitation was continuous throughout gelation. The results of these tests are summarized in Table 1.

TABLE 1

| Volumes of Partially Hydrolyzed Ester Solution | Volumes of 2.8 Percent NH$_4$OH | Time of Set (Minutes) | |
|---|---|---|---|
| | | Continuous Agitation | Initial Mixing Only |
| 84 | 16 | 3 | 3.25 |
| 92 | 8 | 7 | 8 |
| 95 | 5 | 20 | 22 |
| 97 | 3 | 64 | 65 |

Similar studies have shown that time of set can be controlled by control of the alkali concentration over extreme ranges from almost instantaneous setting to several days; concentrated solutions of the strong bases causing almost instantaneous set, 0.01 percent solutions of strong bases causing setting in about 30 hours, and dilute solutions of weakly basic materials causing the set to be delayed several days.

A similar series of tests in which it was ascertained that temperature increases decreased the time of set. In this series of tests 90 volumes of the same partially hydrolyzed ester solution was treated with 10 volumes of 1.5 percent $NH_3$ content ammonium hydroxide using only enough agitation to mix the solutions. The results are summarized in Table 2.

TABLE 2

*Effects of temperature on gelation*

| Temperature (Fahrenheit) | Setting Time (Minutes) |
|---|---|
| 80 | 10 |
| 90 | 8 |
| 100 | 6 |
| 110 | 5 |
| 120 | 4-32 sec. |
| 130 | 3-58 sec. |
| 140 | 3-25 sec. |
| 150 | 2-45 sec. |
| 160 | 2-10 sec. |

In using alkyl esters as chemical grouts, and after ascertaining the time of set for the particular application and estimating the quantity of grout necessary to fill and seal the interstices or cavity, the quantity of ester and the concentration of alkali necessary can be readily calculated. After treating the partially hydrolyzed ester solution with the alkaline solution, the mixture is then pumped or injected into the structure by suitable means and permitted to form the firm gel which is impermeable to fluid flow. When the gel dries it forms a strong, hard, water insoluble, glass-like material in the interstices of the structure which has been grouted.

When using these grouts to fill and seal very large cavities, the shrinkage on dehydration indicates the advisability of a plurality of treatments, in order to completely fill the cavity. However, the sealing has been found to be substantially complete after the first application of the grouting composition.

This method of grouting can be used where other methods of chemical grouting and Portland cement grouting are impractical. A few structures to which this method is applicable are: Grouting of dams and like structures, to shut off water flow through porous rocks, porous concrete, sand, gravel, or soil; the grouting of wells; injection into soils gravel, or weak rock to form improved load-bearing areas for foundations; strengthening loose soil, gravel, and silt in preparation for driving tunnels, sinking shafts, and piling; strengthening side walls of cuts and road beds; and the like.

As shown in the foregoing description and examples, the time of set of alkyl ester grouts can be substantially controlled over a range from instantaneous to several days by regulating the proportions of ester and alkali. Such grouts have the advantage of being insoluble in water before and after setting. Since there is no suspended matter and the viscosity is low, alkyl silicon ester grouts will penetrate fine sands and porous structure that do not lend themselves to other grouting procedures.

While the invention has been particularly described as a grouting process, it is not limited thereto. It can be adapted to control the formation of silica gels from alkyl silicon esters in other processes.

Since many apparently widely differing embodiments of the invention will occur to one skilled in the art, the invention is not limited to the specific details illustrated and described, and various changes can be made therein without departing from the spirit and scope thereof.

What is claimed is:

1. A process for preparing a fluid, substantially non-corrosive grouting composition of selectable setting rate adapted to be injected into the interstices of a structure to be grouted comprising mixing about 50 volumes of tetraethyl orthosilicate, about 30 volumes of 95 per cent ethyl alcohol, and about one volume of water, permitting the mixture to stand at least twenty-four hours thereby partially hydrolyzing the tetraethyl silicate and insuring equilibrium of the hydrolysis reactions, then mixing the resulting partially hydrolyzed solution with an aqueous alkaline solution having a pH of at least 9.0 and containing from about 0.01 to about 30 per cent of an alkaline compound, whereby the setting period of the composition is variable from substantially instantaneous by mixing with the more concentrated alkaline solution to a period of several days by mixing with the less concentrated alkaline solution.

2. A process for preparing a fluid, substantially non-corrosive grouting composition of selectable setting rate adapted to be injected into the interstices of a structure to be grouted comprising mixing about 50 volumes of tetraethyl orthosilicate, about 30 volumes of 95 per cent ethyl alcohol, and about one volume of water, permitting the mixture to stand at least twenty-four hours thereby partially hydrolyzing the tetraethyl silicate and insuring equilibrium of the hydrolysis reactions, then mixing the resulting partially hydrolyzed solution with an aqueous ammonium hydroxide containing from about 0.01 to about 30 per cent of $NH_4OH$, whereby the setting period of the composition is variable from substantially instantaneous by mixing with the more concentrated ammonium hydroxide solution to a period of several days by mixing with the less concentrated ammonium hydroxide solution.

WILLFRED C. BLACKBURN.

REFERENCES CITED

The following references are of record in the file of this patent:

UNITED STATES PATENTS

| Number | Name | Date |
|---|---|---|
| 2,058,844 | Vaughn | Oct. 27, 1936 |
| 2,081,541 | Jooster | May 25, 1937 |
| 2,227,653 | Langer | Jan. 7, 1941 |

FOREIGN PATENTS

| Number | Country | Date |
|---|---|---|
| 575,752 | Great Britain | Mar. 4, 1946 |